Figure 1:
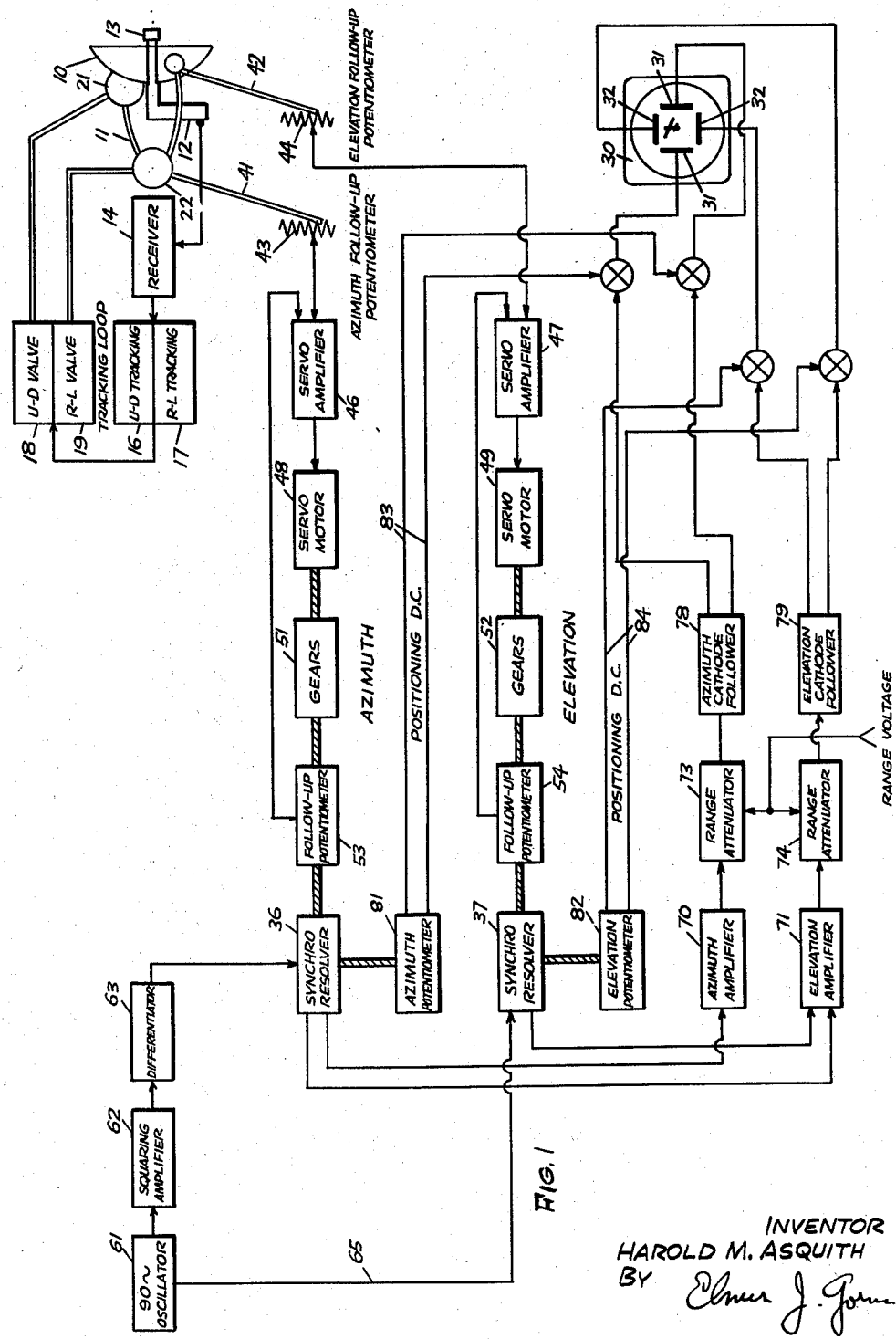
Figure 2A:
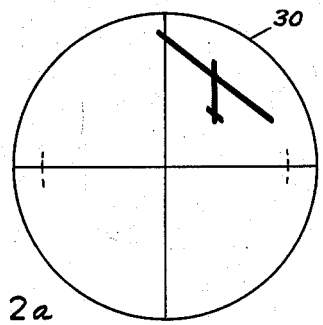
Figure 2B:
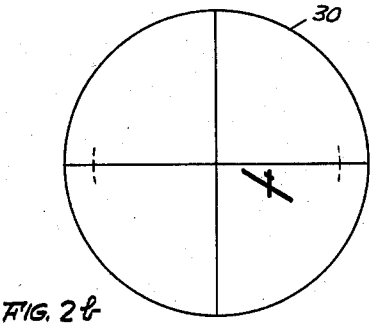
Figure 2C:
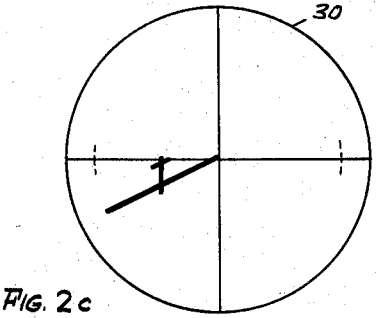
Figure 2D:
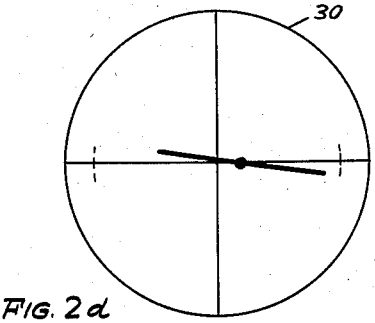
Figure 2E:
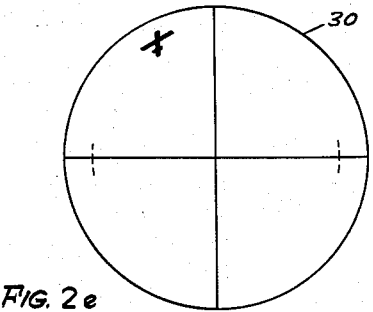
Figure 2F:
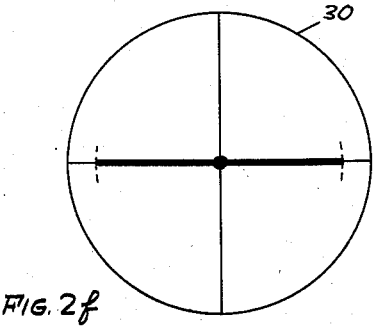

March 22, 1960

H. M. ASQUITH 2,930,036

TARGET DISPLAY SYSTEM

Filed March 3, 1954

3 Sheets-Sheet 1

INVENTOR
HAROLD M. ASQUITH
BY
ATTORNEY

March 22, 1960     H. M. ASQUITH     2,930,036
TARGET DISPLAY SYSTEM

Filed March 3, 1954     3 Sheets-Sheet 2

TARGET UP AND
TO THE RIGHT

TARGET DOWN AND
TO THE RIGHT

TARGET DOWN AND
TO THE LEFT

TARGET TO
THE RIGHT

TARGET UP AND
TO THE LEFT

"ON TARGET"
AT FIRING RANGE

INVENTOR
HAROLD M. ASQUITH
BY
ATTORNEY

March 22, 1960
H. M. ASQUITH
2,930,036
TARGET DISPLAY SYSTEM
Filed March 3, 1954
3 Sheets-Sheet 3
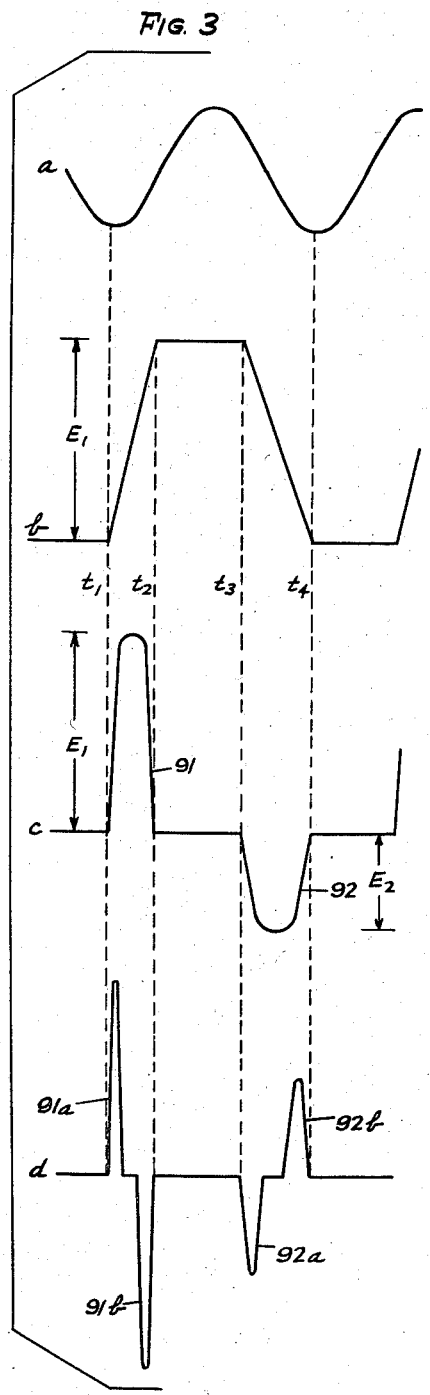
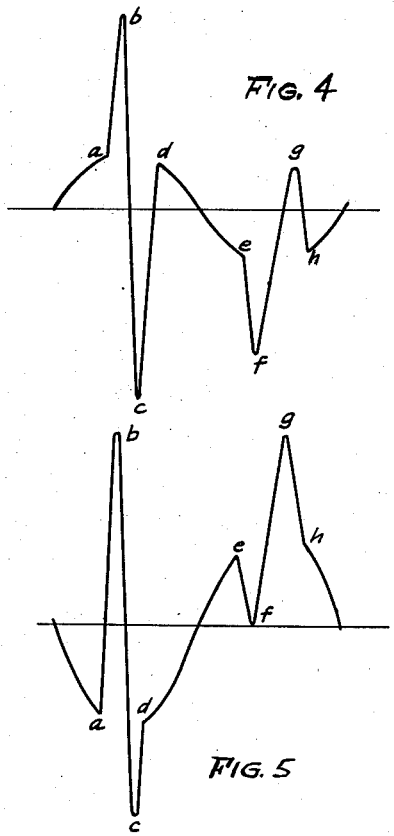
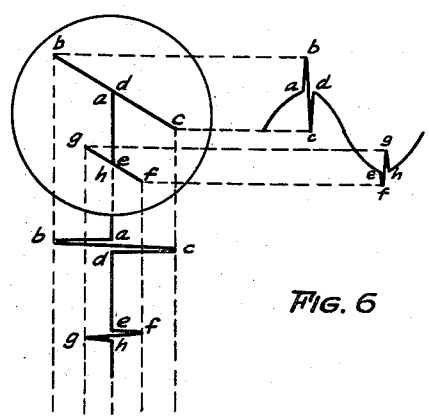
INVENTOR
HAROLD M. ASQUITH
BY
ATTORNEY

United States Patent Office 2,930,036
Patented Mar. 22, 1960

2,930,036

TARGET DISPLAY SYSTEM

Harold M. Asquith, Hyde Park, Mass., assignor to Raytheon Company, a corporation of Delaware Application March 3, 1954, Serial No. 413,813

6 Claims. (Cl. 343—17)

This invention relates to object detection and tracking, and particularly to improvements in methods and means for searching and tracking an airborne target such as an attacking aircraft.

The invention is herein illustrated and described in terms of its application to an interceptor type of aircraft equipped with radar signal transmitting and receiving equipment including a scannig antenna and a cathode ray screen type of target indicator; but the broad concepts of the invention are also applicable in other settings and to other equipment, and for purposes other than military, as will be apparent as the description proceeds.

Most radar equipment is based upon the transmission and reception of pulses of electromagnetic energy of very short duration. The pulse-echo process is repeated periodically at a rate so rapid that the detection of a target causes a steady image to be obtained in a cathode ray tube. This image appears as a tiny spot of illumination on the face of the otherwise unilluminated screen, or window, constituting the visual indicator, or "scope."

Being such a tiny spot, and of variable clarity, this indication leaves much to be desired from an intelligence-communicating standpoint. Moreover, since the spot is static and of no distinctive contour, it conveys no information, per se, as to the specific attitude of, or course being followed by, the "sighted" target. For the same reasons it fails to notify the interceptor pilot of the exact maneuver he should adopt to bring his craft onto the "collision" course, that is, a course calculated to reduce as quickly as possible the spatial distance between the sighted craft and his own.

The present invention provides a method and means whereby there will be presented to the eye of the interceptor pilot an illuminated image of significant contour, significant attitude and significant positioning; the contour being such as to indicate the distance to be traversed to reach the detected target, the attitude being such as to indicate the approximate attitude into which the pilot should maneuver his own craft to achieve the optimum attacking course, and the positioning being such as to indicate the angle of deviation of the target from his own line of flight.

In the illustrated embodiment, the illuminated image has an appearance closely resembling that of a common type of interceptor aircraft; the resemblance being so close that the attitude assumed by the image will convey instantly to the pilot the desired information concerning the attitude into which his own plane should be maneuvered. Moreover, since a pilot's reflexes are conditioned, by habit, to execute a particular muscular action upon presentation to his optical senses of the particular image to which such muscular action is causatively related, the correct manipulation of the pilot's control levers ("joystick" etc.) will occur instinctively, as it were, as an immediate response to absorptions of the image into the optic senses, and without the time lag, or possibility of error, which deliberate mental processes would entail.

These and other characteristics of the invention will be better understood upon reference to the following description of the embodiment of the invention illustrated in the accompanying drawings wherein:

Fig. 1 is a schematic representation of apparatus suitable for producing upon a cathode ray screen an image of contour, attitude and position indicative of the maneuver for execution by the pilot for the purpose of establishing closer approach to interception of a target "sighted" by the antenna assembly of Fig. 1; Figs. 2a to 2f, inclusive, show examples of images appearing under the indicated conditions; Figs. 3a to 3d, inclusive, show the pulse transformation cycle; and Figs. 4, 5 and 6 show representative pulse patterns.

Referring to Fig. 1, reference numeral 10 designates an antenna reflector bowl mounted on a gimbal frame 11 in conventional fashion for rotation in azimuth and elevation in relation to said frame; the gimbal frame 11 being rigid with the body of the aircraft upon which it is mounted. The craft is equipped with radar transmitting apparatus including a T.-R. waveguide assembly 12 terminating in antenna 13 which coacts with antenna reflector 10 in sending out radiant energy for interception by a sought object which may be an airfield beacon or other fixed object, but is herein assumed to be an enemy aircraft upon which it is desired to train the guns or other missiles carried by the interceptor craft upon which the apparatus of Fig. 1 is mounted.

The radiant energy reflected back to antenna 13 by the said enemy craft passes back through T.-R. waveguide assembly 12 to conventional receiver circuitry 14 including frequency modulating and detection means for obtaining a D.C. voltage output having horizontal and vertical components whose respective magnitudes reflect the respective azimuth and elevation directional components of the angle of deviation of the "sighted" enemy craft with respect to the line of flight of the interceptor craft. These horizontal and vertical voltage components, as derived in units 16 and 17, are supplied to control valves 18 and 19 of the tracking mechanism and thus produce actuation of the antenna positioning hydraulic servo-motors 21 and 22, respectively, to maintain the antenna in tracking relationship to the detected enemy craft; the servo 21 operating to vary the angle of elevation of the antenna assembly and the servo 22 to vary the azimuth angle of the antenna assembly.

In the present invention, instead of supplying the positional voltage components directly to the horizontal and vertical deflection plates 31 and 32 of the cathode ray tube 30 as in conventional practice, the said direct connection procedure of the prior art is superseded by a method involving the following steps: first, the reproduction of the two orthogonal motion components of the antenna assembly in two remotely disposed synchro resolvers (indicated at 36 and 37 in Fig. 1); second, the generation of oscillations of relatively low frequency and the shaping of said oscillating energy to square pulse form; third, the differentiating and time-modulating of said pulses to cause their superpositioning in a manner that will produce two parallel light streaks of unequal length but symmetrical design, simulating the wings and tail of an aircraft, when displayed on the fluorescent screen of cathode ray tube 30; fourth, the feeding of said pulses to the azimuth synchro resolver 36, where they are divided vectorially to correspond to the angle through which the resolver has been rotated in reproducing the degree of departure of the antenna assembly, in azimuth, from the longitudinal axis of the craft; fifth, the feeding into the elevation synchro resolver of the generated oscillations in the form of a sine wave whose amplitude is adjusted to correspond to the degree of rotation of the elevation synchro resolver from the horizontal reference plane; sixth, the amplification and range-voltage controlled attenuation of the vectorially divided and amplitude-corrected pulses resulting from steps 2, 3, and 4; seventh, the application of D.C. voltages to the output resulting from step No. 5; and eighth, the delivery of the combined product of steps 2, 3, 4 and 5 to the respective horizontal and vertical deflection plates of tube 30, to produce on the tube screen an illuminated image of an aircraft, the image including two parallel streaks and a connecting vertically disposed streak, with the size of the image components being proportional to the degree of range-voltage controlled attenuation produced in step No. 5, with the angle of inclination corresponding to the vectorial division produced in step No. 3, and with the length of the connecting vertical streak being proportional to the sine wave amplitude as adjusted in step No. 4.

A pictorial representation of the aircraft, lifelike in appearance, is thus presented on the radarscope 30. The positioning of the wings in relation to the tail (above as in Fig. 4 or below as in Fig. 5) simulates the appearance of a craft climbing or diving, and indicates to the pilot of the interceptor craft that he is to climb or dive to boresight his guns on the target. The parallel lines representing the wings and tail bank to the right or left, representing to the pilot that he is to bank his plane to the right or left to align his guns with the target. Simultaneously, with the change of attitude of the simulated target, the position on the scope changes, that is, if the target is to the right on the scope, the wings and tail bank right. When the target is above the center of the scope, the target appears to be climbing as the wings are above the tail. An interception course is then attained by maneuvering to place the target in the center of the scope and in an attitude such that the wings and tail are lined up in elevation and are not banked, similar to the appearance of a plane dead ahead.

Returning to the Fig. 1 diagram, the components involved in reproducing the horizontal and vertical vectorial components of the antenna bowl's rotation are the electric servo motors 48 and 49 energized from amplifying sources 46 and 47, respectively, with the respective degrees of energization being controlled by the variation of resistance included in the excitation circuits 43 and 44 as the resistance adjusting arms 41 and 42 follow the respective motions of the antenna positioning hydraulic servos 22 and 21 heretofore referred to.

Rotation of electric servos 48 and 49 is communicated to the synchro resolvers 36 and 37, respectively, by way of the interposed speed reducing gear trains 51 and 52, to which are connected synchronously shiftable potentiometers 53 and 54, respectively, to feed back into the servo-amplifiers 46 and 47 the proportionate follow-up voltage restoration values for restoring equilibrium. The degree of rotation thus imparted to azimuth synchro resolver 36 constitutes the measurement for establishing the relative magnitudes of the horizontal and vertical vectors into which the resolver 36 divides the pulses successively received from the square wave pulse forming and combining units 61, 62, and 63; the said horizontal and vertical vectors being the orthogonal components of the angle through which the resolver 36 has rotated with respect to its zero (longitudinal axis) position.

The square wave pulse forming and combining units include a ninety-cycle oscillator 61 to generate the basic wave, and a pulse former 62 to square the wave and effect a first differentiation thereof, thereby producing a pulse fragment suggestive of one side of the wing of an aircraft, together with the opposite side of the same craft's tail; the basic sine wave being indicated in Fig. 3a, the square wave resultant in Fig. 3b, the first "wing" fragment at 91 in Fig. 3c, and the first "tail" fragment at 92 in Fig. 3c. These pulse fragments 91 and 92 are then subjected to a second differentiation in a conventional inductance-resistance differentiator circuit, as indicated at 63 in Fig. 1, to produce the second, or complementary "wing" fragment 91b and "tail" fragment 92b, as shown in Fig. 3d. It will be observed upon reference to Fig. 3b that the pulse "squaring" is accomplished in a manner to produce a sharper slope on the leading edge of the pulse than on the trailing edge; hence time interval $t_4-t_3$ is greater than $t_2-t_1$ and therefore $$\frac{E_1}{t-t_1} > \frac{E_1}{t_4-t_3}$$

Accordingly, the first stage of differentiation will produce pulse fragments (91 and 92, Fig. 3c) which will differ in amplitude to a degree conforming to the ratio:

$$\frac{E_1}{E_2} = \frac{t_4-t_3}{t_2-t_1}$$

which difference will carry through the second differentiation stage, as illustrated in Fig. 3d, to cause "tail" pulse fragments 92a, 92b to be shorter than "wing" pulse fragments 91a, 91b. The complementary halves of the wing fragment, on the other hand, will equal each other in length because the leading and trailing slopes of pulse fragment 91 are equal; and for a corresponding reason the complementary halves of tail fragments 92a, 92b are equal.

The pulse fragments 91a, 91b, 92a, and 92b (and their successive counter-parts produced at the 90-cycle repetition rate) are introduced into the azimuth synchro resolver 36 where they are vectorially divided for distribution (as vector voltages) to the respective azimuth and elevation amplifiers 70 and 71; the magnitude of the voltage vector component entering each amplifier being proportional to the azimuth deviation angle, as above explained. The vector voltage component entering the elevation amplifier combines with the sine wave amplitude voltage entering the elevation amplifier from the elevation synchro resolver 37 and which sine wave amplitude voltage is established by the inter-action of the sine wave input into the elevation synchro 37 (from the oscillator 61 by way of supply line 65) with the magnetic fields produced in said synchro 37 by its angular deviation from zero setting in obedience to the rotational effort applied thereto in synchronism with the antenna elevating motion as heretofore described; the degree of such rotation being reflected in the magnitude of the amplitude of the sine wave, with the sine wave amplitude shrinking to zero when the tracking antenna is in the zero elevation or "dead ahead" attitude and the amplitude rising to maximum when the tracking antenna is in maximum elevation attitude. The sine wave amplitude is reflected in the signal supplied to the elevation amplifier 71 where it combines with the "wing and tail" signals supplied to said amplifier 71 from the resolver 36. Accordingly, as these combined signals are delivered by way of the cathode follower circuits 78 and 79 leading from amplifiers 70 and 71 to the four conventional horizontal and vertical deflection plates of the cathode ray tube, they will coact (in a manner graphically suggested in Fig. 6) to produce upon the screen of the tube the complete image representing both the attitude and the direction of flight of the aircraft in relation to the central position constituting the plane's objective. Simultaneously, the range attenuation action of the components indicated at 73 and 74 will introduce into the image forming signals an attenuation factor which will control the overall dimensions, or contour, of the image as actually displayed upon the radarscope, so that the shifting size of the image will indicate the degree of change in distance intervening between the interceptor craft and its target.

The position of the image, as distinguished from its attitude and contour, is controlled primarily by the inter-action of the positioning voltages supplied to the deflection plates by lines 83 and 84 connecting said plates to the potentiometers 81 and 82 whose resistance values shift in synchronism with resolvers 36 and 37, respectively, to which the potentiometer adjusting arms are connected.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. A target display system comprising an antenna mounted for movement in azimuth and elevation with respect to that on which it is mounted, a cathode ray tube having beam deflection apparatus, means connected between said antenna and said beam deflection apparatus for providing beam positioning signals representing the azimuthal and elevational positions of said antenna, means connected to said deflection apparatus for causing the beam of said tube to describe a first line, means connected to said deflection apparatus for causing the beam of said tube to describe a line intersecting said first line, said last named means including a resolver for controlling the angle of intersection between said first and second lines, and means connected between said antenna and said resolver for causing the output of said resolver to be controlled by the position of said antenna with respect to that on which it is mounted.

2. A target display system comprising an antenna mounted for movement in azimuth and elevation, a cathode ray tube having beam deflection apparatus, first means connected between said antenna and said beam deflection apparatus for providing beam positioning signals representing the azimuthal and elevational positions of said antenna, second means connected to said deflection apparatus for causing the beam of said tube to describe a first line, third means connected to said deflection apparatus for causing the beam of said tube to describe a pair of parallel lines intersecting said first line, said third means including a resolver for controlling the angle of intersection between said first line and each of said parallel lines, means connected between said antenna and said resolver for causing the output of said resolver to be controlled by the position of said antenna, and signal attenuation devices included in said second means and said third means, the attenuation of said devices being controllable by an impressed range signal representing the distance from said antenna to a target.

3. A target display system comprising an antenna mounted for movement in azimuth and elevation with respect to that on which it is mounted, a first resolver, means connected between said antenna and said first resolver for causing the output of said resolver to be indicative of the azimuthal position of said antenna with respect to that on which it is mounted, a second resolver, means connected between said antenna and said second resolver to cause the output of said second resolver to be indicative of the elevational position of said antenna with respect to that on which it is mounted, a cathode ray tube having beam deflection apparatus, means connected to said beam deflection apparatus for providing beam positioning signals to cause the beam of said tube to be positioned at a location corresponding to the position of said antenna, pulse shaping means coupled to said first resolver, said pulse shaping means including an oscillator coupled to said second resolver and causing said beam to describe a first line and a pair of parallel lines intersecting said first line, and means coupling the outputs of said first and second resolvers to said beam deflection means.

4. A target display system comprising a directional antenna mounted for movement in azimuth and elevation, a receiver coupled to said antenna, means connected to said antenna and responsive to the output of said receiver for causing said antenna to track a target, a cathode ray tube having beam deflection apparatus, first means connected between said antenna and said beam deflection apparatus for providing beam positioning signals representing the azimuthal and elevational positions of said antenna, second means connected to said deflection apparatus for causing the beam of said tube to describe a first line, third means connected to said deflection apparatus for causing the beam of said tube to describe a second line intersecting said first line, said third means including a resolver for controlling the angle of intersection between said first and second lines, means connected between said antenna and said resolver for causing the output of said resolver to be controlled by the position of said antenna, and signal attenuation apparatus included in said second means and said third means, said signal attenuation apparatus being responsive to a range signal representing the distance from said antenna to said target.

5. A target display system comprising an antenna mounted for movement in azimuth and elevation with respect to that on which it is mounted, a cathode ray tube having beam deflection apparatus, means connected between said antenna and said beam deflection apparatus for providing beam positioning signals representing the azimuthal and elevational positionns of said antenna, means connected to said deflection apparatus for causing the beam of said tube to describe a first line, means connected to said deflection apparatus for causing the beam of said tube to describe a line intersecting said first line, said last named means including a resolver for controlling the angle of intersection between said first and second lines, means connected between said antenna and said resolver for causing the output of said resolver to be controlled by the position of said antenna with respect to that on which it is mounted, and signal attenuation apparatus included in said means connected to said beam deflection apparatus, said signal attenuation apparatus being responsive to a range signal representing the distance from said antenna to said target.

6. A target display system comprising an antenna mounted for movement in azimuth and elevation with respect to that on which it is mounted, a first resolver, means connected between said antenna and said first resolver for causing the output of said resolver to be indicative of the azimuthal position of said antenna with respect to that on which it is mounted, a second resolver, means connected between said antenna and said second resolver to cause the output of said second resolver to be indicative of the elevational position of said antenna with respect to that on which it is mounted, a cathode ray tube having beam deflection apparatus, means connected to said beam deflection apparatus for providing beam positioning signals to cause the beam of said tube to be positioned at a location corresponding to the position of said antenna, pulse shaping means coupled to said first resolver, said pulse shaping means including an oscillator coupled to said second resolver and causing said beam to describe a first line and a pair of parallel lines intersecting said first line, means coupling the outputs of said first and second resolvers to said beam deflection means, and signal attenuation apparatus included in said means connected to said beam deflection apparatus, said signal attenuation apparatus being responsive to a range signal representing the distance from said antenna to said target.

References Cited in the file of this patent

UNITED STATES PATENTS

| Number | Name | Date |
|---|---|---|
| 2,226,930 | Hefele | Dec. 31, 1940 |
| 2,427,905 | Fyler | Sept. 23, 1947 |
| 2,467,319 | King | Apr. 12, 1949 |
| 2,530,060 | Holdam | Nov. 14, 1950 |
| 2,571,165 | Rines | Oct. 16, 1951 |